United States Patent [19]
Taniguchi et al.

[11] Patent Number: 5,508,143
[45] Date of Patent: Apr. 16, 1996

[54] OPTICAL RECORDING MEDIUM

[75] Inventors: Hitoshi Taniguchi; Fumio Matsui, both of Tsurugashima, Japan

[73] Assignee: Pioneer Electronic Corporation, Tokyo, Japan

[21] Appl. No.: 126,514

[22] Filed: Sep. 24, 1993

[30]  Foreign Application Priority Data

Sep. 28, 1992 [JP] Japan ..................... 4-258576

[51] Int. Cl.⁶ ........................................ G11B 7/24
[52] U.S. Cl. ................ 430/270.21; 430/962; 430/945
[58] Field of Search ................... 430/945, 495, 430/19, 962, 270; 369/288; 252/586

[56]  References Cited

U.S. PATENT DOCUMENTS

| | | | |
|---|---|---|---|
| 4,220,708 | 9/1980 | Heller | 430/336 |
| 4,737,449 | 4/1988 | Heller et al. | 430/343 |
| 5,061,582 | 10/1991 | Brettle et al. | 430/19 |
| 5,088,086 | 2/1992 | Van et al. | 369/100 |
| 5,130,058 | 7/1992 | Tanaka et al. | 252/586 |

FOREIGN PATENT DOCUMENTS 63-258876  10/1988  Japan .

OTHER PUBLICATIONS

Yokoyama et al., "Synthesis and Photochromic Behavior of 5–Substituted Indolylfulgides", Jul. 1991, Chem. Lett., pp. 1125–1128.

"Photochromism of a Protonated 5–Dimethylaminoindolyl Fulgide: A Model of a Non–Destructive Readout for a Photon Mode Optical Memory", Yokoyama et al., pp. 1722–1724, (1991).

"Photochromic Fulgides Applicable to Optical Information Storage—Discovery of New Non–destructive Readout Method", Yokoyama et al., pp. 998–1005, (1992).

*Primary Examiner*—Charles L. Bowers, Jr.
*Assistant Examiner*—John A. McPherson
*Attorney, Agent, or Firm*—Kane, Dalsimer, Sullivan, Kurucz, Levy, Eisele and Richard

[57]  ABSTRACT

An optical recording medium comprises a baseplate and a record film, on which information is recorded, disposed on the base plate, the record film containing 5-dimethylamino indolyl fulgide, of the specific formula, and a resin binder. The information recorded in the optical recording medium is reproduced by irradiating a first light to the record film, the first light being absorbed by 5-dimethylamino indolyl fulgide in an open ring form, whereby the open ring form is changed to a closed ring form and information is recorded and irradiating a second light to the record film in which record is recorded, the second light having zero of quantum yield in changing the closed ring form to the open ring form and being absorbed by the closed ring form, whereby the recorded information is reproduced.

6 Claims, 4 Drawing Sheets

OPTICAL RECORDING MEDIUM

BACKGROUND OF THE INVENTION

The present invention relates to an optical recording medium and, in particular, to an optical recording medium using a photochromic material as a record film, which ensures reliable retention of information recorded therein even if the recorded information is repeatedly reproduced and also relates to a process for reproducing information recorded in the optical recording medium.

An optical recording medium in general includes a record film, on which information is recorded by irradiating a recording light.

A photochromic material, which is used for a filter for adjusting luminous energy, a display, an actinometer, a recording medium for photo-printing process, a paint or the like, becomes also recently important in the field of an optical recording medium using laser beams as a recording light, because it has been found that the photochromic material has a possibility of being used as a reversible memory medium with a high density of information.

Recording and erasing of information in an optical recording medium, in which the photochromic material, for example, an azo compound, is used as a record film, is carried out, for example, in the following manner. Namely, a recording light having 420 nm of wavelength is irradiated to a record film, and the irradiated part in the record film is then colored to form a colored record spot corresponding to a record pit. Thereafter, if an erasing light having 550 nm of wavelength is irradiated, the colored record spot is discolored so that the record pit disappears.

However, reproducing of information recorded in the optical recording medium provides the following problem. If the reproducing is carried out by using the light having 420 nm of wavelength, the part of the record pit remains without disappearing but the other un-colored part is colored. As a result, the whole of the record film is colored, thereby the record pit being covered, that is, the recorded information disappears. On the other hand, if the reproducing is carried out by using the light having 550 nm of wavelength, the colored record spot is discolored, so that the recorded information disappears.

In such manner, the greatest problem of the optical recording medium in which the photochromic material is used as a record film is that the recorded information disappears in reproducing by using the above reproducing light so that it is impossible to repeatedly reproducing the recorded information.

To solve such problem, a process for reproducing the recorded information has been recently proposed, in which a mixed light comprising the light having 420 nm of wavelength (hereinafter referred to as a 420 nm light) and the light having 550 nm of wavelength (hereinafter referred to as a 550 nm light) is used for reproducing the recorded information. The principle is as follows. When the mixed light is irradiated to the record film, on which information is recorded, to reproduce the recorded information, in the colored record spot, that is, the record part, the 550 nm light is absorbed to discolor the colored record spot, thereby heat is produced. The heat promotes the coloring reaction by the 420 nm light to retain the colored record spot. On the other hand, in the part other than the colored record spot, that is, the un-record part, the 550 nm light is not absorbed, so that heat is not produced, whereby even if the part absorbs the 420 nm light and the coloring reaction occurs, thus the reaction being not promoted. As a result, if the part is slightly colored, the slightly coloring is discolored by the 550 nm light to retain the un-record part.

Even thought the mixed light is used in reproducing the information, coloring remains to a slight degree. Therefore, when the reproducing is repeated, the 550 nm light becomes absorbed by the slight coloring to produce the increased heat, so that the un-record part is colored to such a degree not so as to distinguish the record part with the un-record part.

SUMMARY OF THE INVENTION

An object of the present invention is to substantially eliminate defects or drawbacks encountered in the prior art and to provide an optical recording medium which ensures the reliable retention of the recorded information even if the reproducing is repeated.

Another object of the invention to provide a process for reproducing the information which is recorded in the optical recording medium capable of repeatedly performing the recording.

These and other objects can be achieved according to the present invention, in one aspect, by providing an optical recording medium comprising:

a base plate; and a record film, on which information is recorded,disposed on the base plate, the record film containing 5-dimethylamino indolyl fulgide and a resin binder.

In preferred embodiments, 5-dimethylamino indolyl fulgide is in a open ring form of a following formula I,

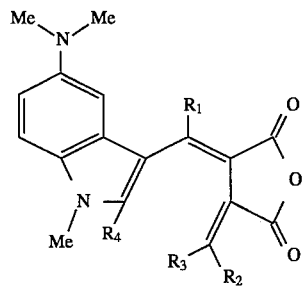

wherein R1 to R4 are, respectively, hydrogen, halogen, alkyl, alkoxyl, aryl, aryloxy, allyl, aralkyl, amino, pyrrolyl, furil, thienyl, thiazolyl, oxazolyl, cyano, nitro, ester or trifluorometehyl, and are the same or different kinds, and Me is methyl.

In another point of view, 5-dimethylamino indolyl fulgide is in a closed ring form of a following formula II,

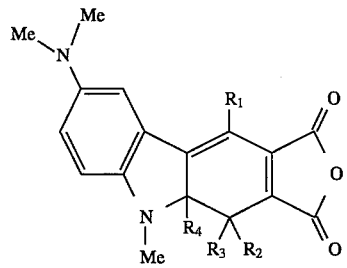

wherein R1 to R4 are, respectively, hydrogen, halogen, alkyl, alkoxyl, aryl, aryloxy, allyl, aralkyl,amino, pyrrolyl, furil, thienyl, thiazolyl, oxazolyl, cyano, nitro, ester or trifluoromethyl, and are the same or different kinds, and Me is methyl.

The resin binder is contained by 5 to 500 parts by weight, preferably 20 to 100 parts by weight, per part of 5-methylamino indolyl fulgide. The resin binder is selected from the group consisting of polymethylmethacrylate, polycarbonate, amorphous polyolefine, polystylene, polyvinyl chloride, polyvinyl acetate, polyvinyl butyrale, polyvinylidene chloride, polypropylene, polyethylene, polyacrylonitrile, urethane resin, epoxyresin, polyester, phenol resin, phenoxy resin, polyacrylate, polysulfone, polyether sulfone, polyallysulfone and polyether imide.

In another aspect of the present invention, there is provided a process for reproducing information recorded in an optical recording medium of the characters described above, which comprises the steps of:

irradiating a first light to the record film, the first light being absorbed by 5-dimethylamino indolyl fulgide in an open ring form, whereby the open ring form is changed to a closed ring form and information is recorded;and irradiating a second light to the record film in which record is recorded, the second light having zero of quantum yield in changing the closed ring form to the open ring form and being absorbed by the closed ring form, whereby the recorded information is reproduced.

The first light has 300 to 500 nm of wavelength and the second light has 750 to 950 nm of wavelength, and preferably the first light has 370 to 420 nm of wavelength and the second light has 780 to 830 nm of wavelength.

According to the present invention of the characters described above, the optical recording medium comprises a base plate and a record film, on which information is recorded, disposed on the base plate, the record film containing 5-dimethylamino indolyl fulgide, of the specific formula described above, and a resin binder.

The information recorded in the optical recording medium is reproduced by irradiating a first light to the record film, the first light being absorbed by 5-dimethylamino indolyl fulgide in an open ring form, whereby the open ring form is changed to a closed ring form and information is recorded and irradiating a second light to the record film in which record is recorded, the second light having zero of quantum yield in changing the closed ring form to the open ring form and being absorbed by the closed ring form, whereby the recorded information is reproduced.

According to the present invention, the quantum yield is made zero and the absorbance is the plus value in the range of 750 nm or longer of wavelength. Therefore, it can be understood that the light having 750 nm or longer of wavelength can be used as a reproducing light, and, even if the reproducing light having 750 nm or longer of wavelength is continuously irradiated to the record part, the absorbance is not changed. Therefore, it can be confirmed that the information recorded in the optical recording medium is reliably retained even if reproduction is repeated.

The nature and further features of the present invention will be made further clear from the following descriptions made with reference to the accompanying drawings.

DESCRIPTION OF THE PREFERRED EMBODIMENTS

Figure 1:
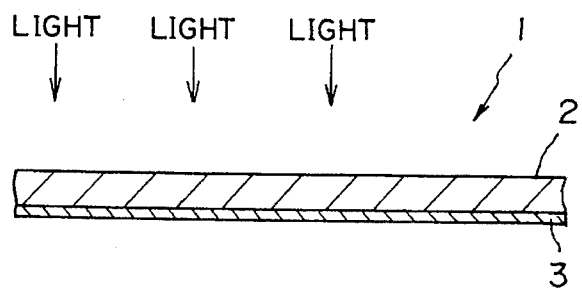
FIG. 1 is a partial cross sectional view of an optical recording medium according to the present invention.

The present invention will be described with reference to FIG. 1. FIG. 1 shows a partial cross sectional view of an optical recording medium according to the present invention. In FIG. 1, an optical recording medium 1 has a record film 3 disposed on a base plate 2. Information is recorded by irradiating a recording light to the medium from the side of the base plate 2. It is also possible to provide various known layers, such as protection layer, between the base plate 2 and the record film 3 or on the record film 3.

The record film 3 contains 5-dimethylaminoindolyl fulgide which can be present in the open ring or closed ring form of the following formula I or II

Formula I

Formula II wherein the groups R1 to R4 are, respectively, hydrogen, halogen, alkyl,preferably C1 to C6-alkyl, alkoxyl, aryl, aryloxy, allyl, aralkyl, amino, pyrrolyl, furil, thienyl, thiazolyl, oxazolyl, cyano, nitro, ester or trifluoromethyl, and may be same or different, and Me is methyl.

5-dimethylamino indolyl fulgide in the open ring form of the formula I is in a discolored form. 5-dimethylamino indolyl fulgide in the closed ring form of the formula II is in a colored form. If information is recorded on the record film 3, the fulgide in the discolored form is converted to that in the colored form, so that the presence of information can be known from coloring.

The record film 3 further contains resin as a binder (hereinafter referred to as a resin binder), such as, for example, polymethyl methacrylate (PMMA),polycarbonate (PC), amorphous polyolefine (APO), polystylene, polyvinyl chloride, polyvinylacetate, polyvinylbutyral, polyvinylidenechloride, polypropylene, polyethylene, polyacrylonitrile, urethane resin, epoxyresin, polyester, phenol resin, phenoxy resin, polyacrylate, polysulfone, polyether sulfone, polyallysulfone or polyether imide, alone or in mixture.

The binder resin is contained in the record film in order to give the photochromic property to the compound of the formula I or II. That is, the compound of the formula I or II shows the following photochromic reaction only in mixture with the binder resin:

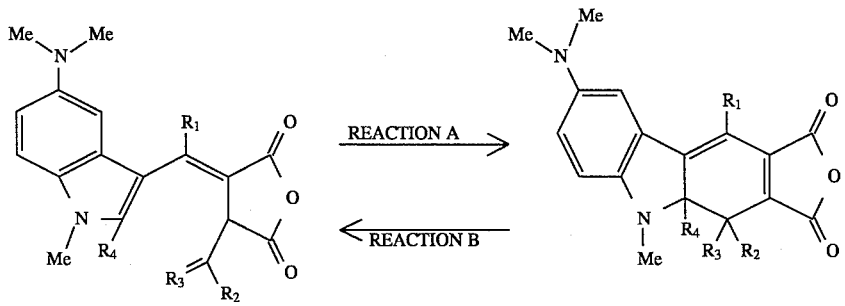

As shown in the above reaction formula, the compound in the open ring form is converted to the compound in the closed ring form by irradiating a light having, for example, 400 nm wavelength (Reaction A). The compound in the closed ring form is converted to the compound in the open ring form by irradiating a light having, for example, 680 nm wavelength (Reaction B). If the compound of the formula I or II is incorporated in, for example, a toluene solution without the resin binder, Reaction A occurs but Reaction B does not occur. From this fact, it had been understood that the compound of the formula I or II does not have the photochromic property.

The content of the resin binder to be used according to the present invention is 5 to 500 parts by weight, preferably 20 to 100 parts by weight, per part by weight of 5-methylamino indolyl fulgide. If the content of the resin binder is more than 500 parts by weight, it becomes difficult to distinguish the record part with the un-record part. If the content of the resin binder is less than 5 parts by weight, the fulgide does not dissolve in the resin binder and precipitates out.

The record film according to the present invention is formed on the base plate by mixing the compound of the formula I or II, the resin binder and a solvent, applying the resulting mixture to the base plate, for example, by a spinner, and completely removing the solvent. As the solvent, any solvent which dissolves the binder can be used, for example, dichloroethane.

Recording, reproducing and erasing of information in the above-described optical recording medium are carried out in the following manner.

At first, before recording, the optical recording medium is in an un-recorded state, in which 5-dimethylamino indolyl fulgide is in the open ring form, that is, the discolored form of the formula I. Information is recorded by irradiating a light having the first wavelength to convert the open ring form of the formula I to the closed ring form of the formula II (Reaction A). The first wavelength is, in general, 300 to 500 nm, preferably 370 to 420 nm.

Such recorded information is reproduced by using a light having a second wavelength. The light having the second wavelength is absorbed by the record film, that is, the closed ring compound of the formula II, but, does not convert the closed ring compound to the open ring compound, that is, has zero of quantum yield. This means the amount of reaction of the photochromic material relative to the amount of absorption of light. As described above, when the information recorded in the optical recording medium according to the present invention is reproduced by the light having second wavelength, the recorded information can be reproduced without discoloring the record part (the colored part). On the other hand, the open ring compound of the fulgide corresponding the un-recorded part does not absorb the light having the second wavelength as the reproducing light. The second wavelength has, in general, 750 to 950 nm, preferably 780 to 830 nm.

The recorded information is erased by using a light having a third wavelength. The light having the third wavelength is absorbed by the closed ring and converts the closed ring compound to the open ring compound (Reaction B), that is, has large quantum yield. The third wavelength is, in general, 500 to 700 nm, preferably 550 to 650 nm.

In view of the above matter, according to the present invention, the recorded state can be understood as an un-recorded state, conversely, the un-recorded state can be understood as a recorded state. Therefore, "record" and "un-record" can be changed to "un-record" and "record", respectively, in the specification and the claims.

The following examples are used to explain the present invention in detail.

EXAMPLE I

One part by weight of 5-dimethylamino indolyl fulgide of the formula I wherein $R_1$ to $R_4$ are methyl, respectively, 50 parts by weight of polycarbonate as a binder resin, and 500 parts by weight of dichloroethane as a solvent were mixed together, the mixture was applied to the glass base plate so as to be 10 μm in thickness when the solvent was removed. The solvent was completely removed to obtain Sample 1 according to the present invention.

EXAMPLE II

The procedure of preparing Sample 1 was repeated, except for using polymethacrylate instead of polycarbonateas a binder resin, to obtain Sample 2 according to the present invention.

EXAMPLE III

The procedure of preparing Sample 1 was repeated, except for using amorphous polyolefine instead of polycarbonate as a binder resin, to obtain Sample 3 according to the present invention.

The light having 400 nm of wavelength was irradiated to each of the above Samples 1 to 3 according to the present invention, and the open ring compound was converted to the closed ring compound to form the colored part (the record part). When the discoloring light having 650 nm of wavelength was then irradiated to the record part, the discoloring reaction shown as Reaction B described above occurred to discolor the colored part.

The light having 400 nm of wavelength was again irradiated to each of the above Samples 1 to 3 according to the present invention, and the open ring compound was then converted to the closed ring compound to form the colored part (the record part).

The absorbance of the colored part was determined by a spectrophotometer. Subsequently, the closed ring compound in each of the above Samples was converted to the open ring compound by each of the lights having 550 nm, 600 nm, 650 nm, 700 nm, 725 nm and 750 nm of wavelength, and the quantum yield thereof was determined by measuring the number of photons which are absorbed in each of the samples and the number of the converted open ring compounds, by using a quantum yield-measuring apparatus comprising a 500 W xenon lamp, a spectrometer, a sample chamber and a research radio meter.

Figure 2:
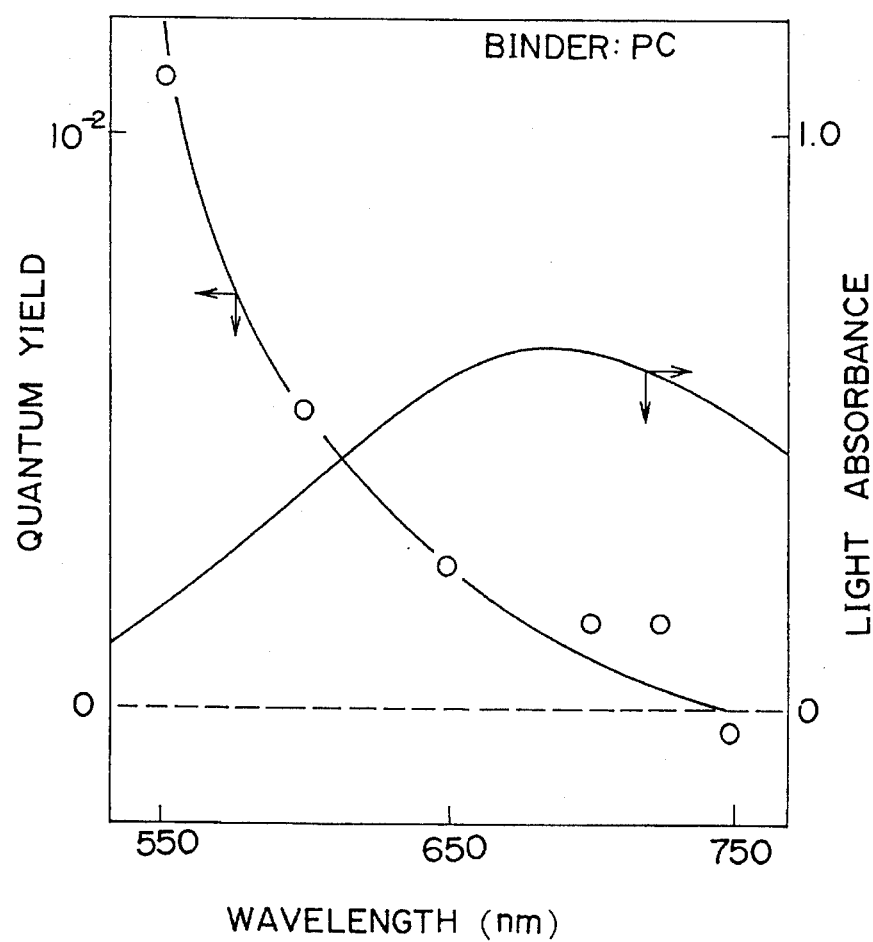
FIG. 2 is a graph showing the relationship between quantum yield and absorbance, and wavelength for one sample of the optical recording medium according to the present invention (Sample 1 described below)
Figure 3:
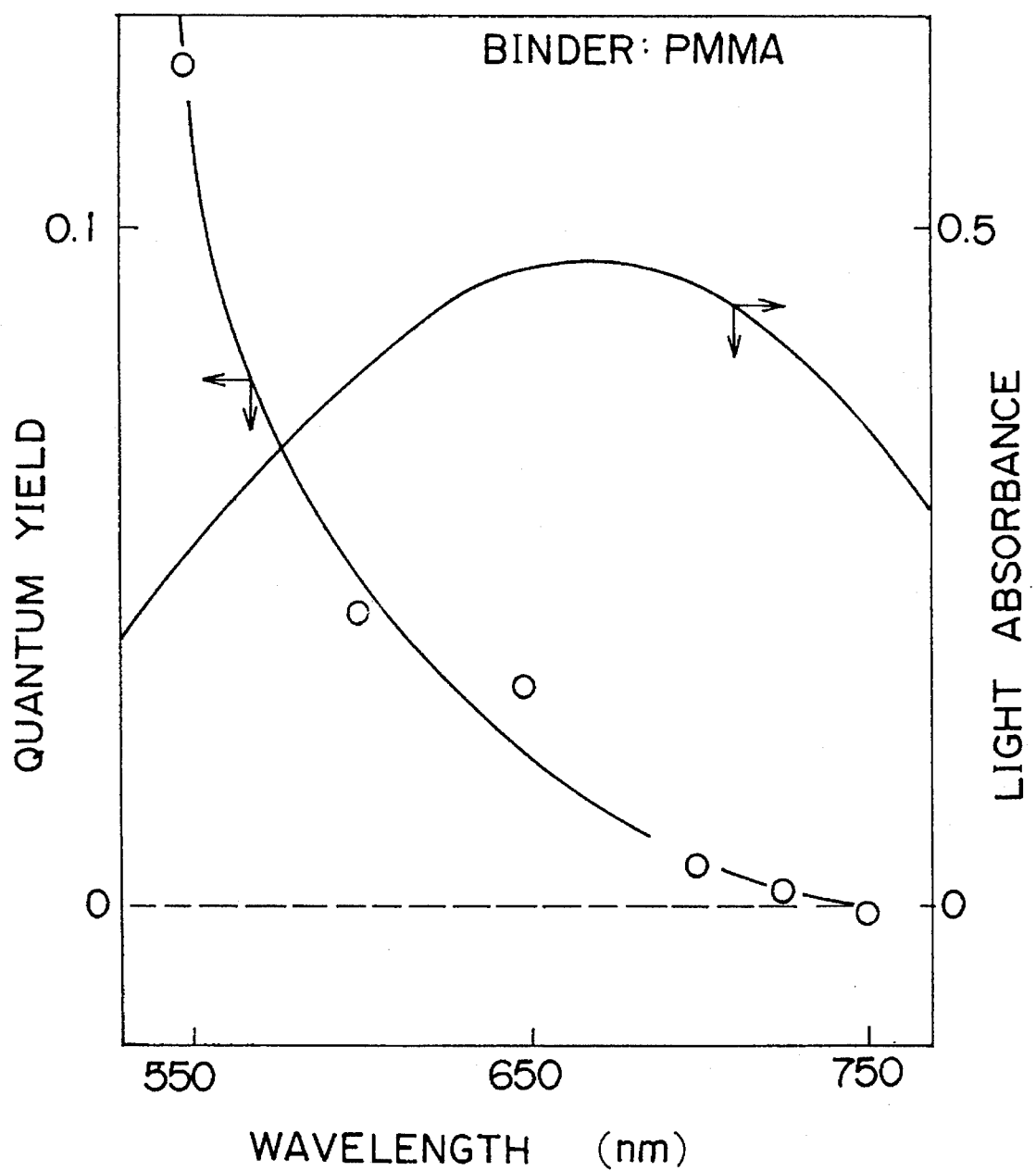
FIG. 3 is a graph showing the relationship between quantum yield and absorbance, and wavelength for another sample of the optical recording medium according to the present invention (Sample 2 described below)
Figure 4:
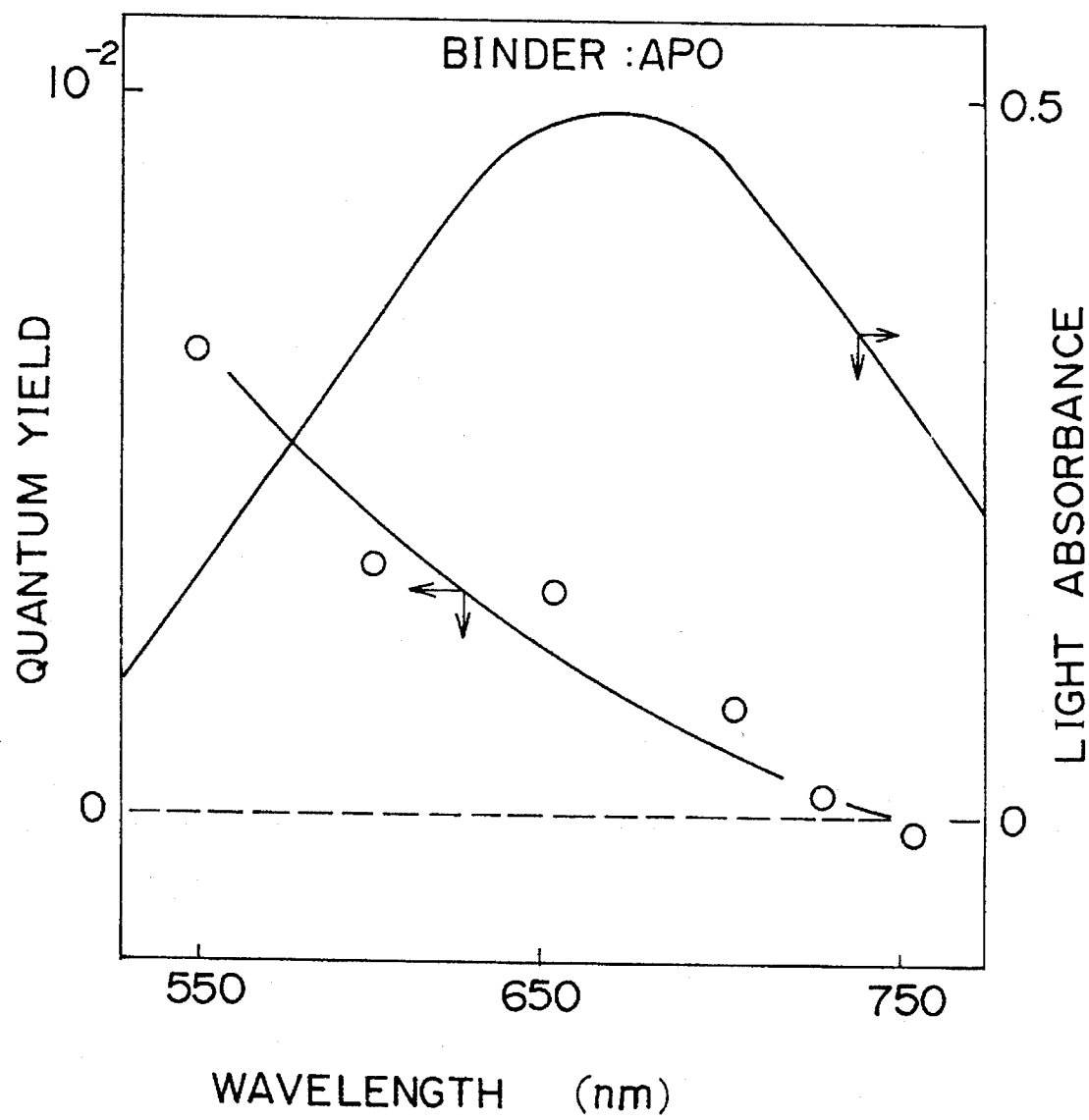
FIG. 4 is a graph showing the relationship between quantum yield and absorbance, and wavelength for a further sample of the optical recording medium according to the present invention (Sample 3 described below)
Figure 5:
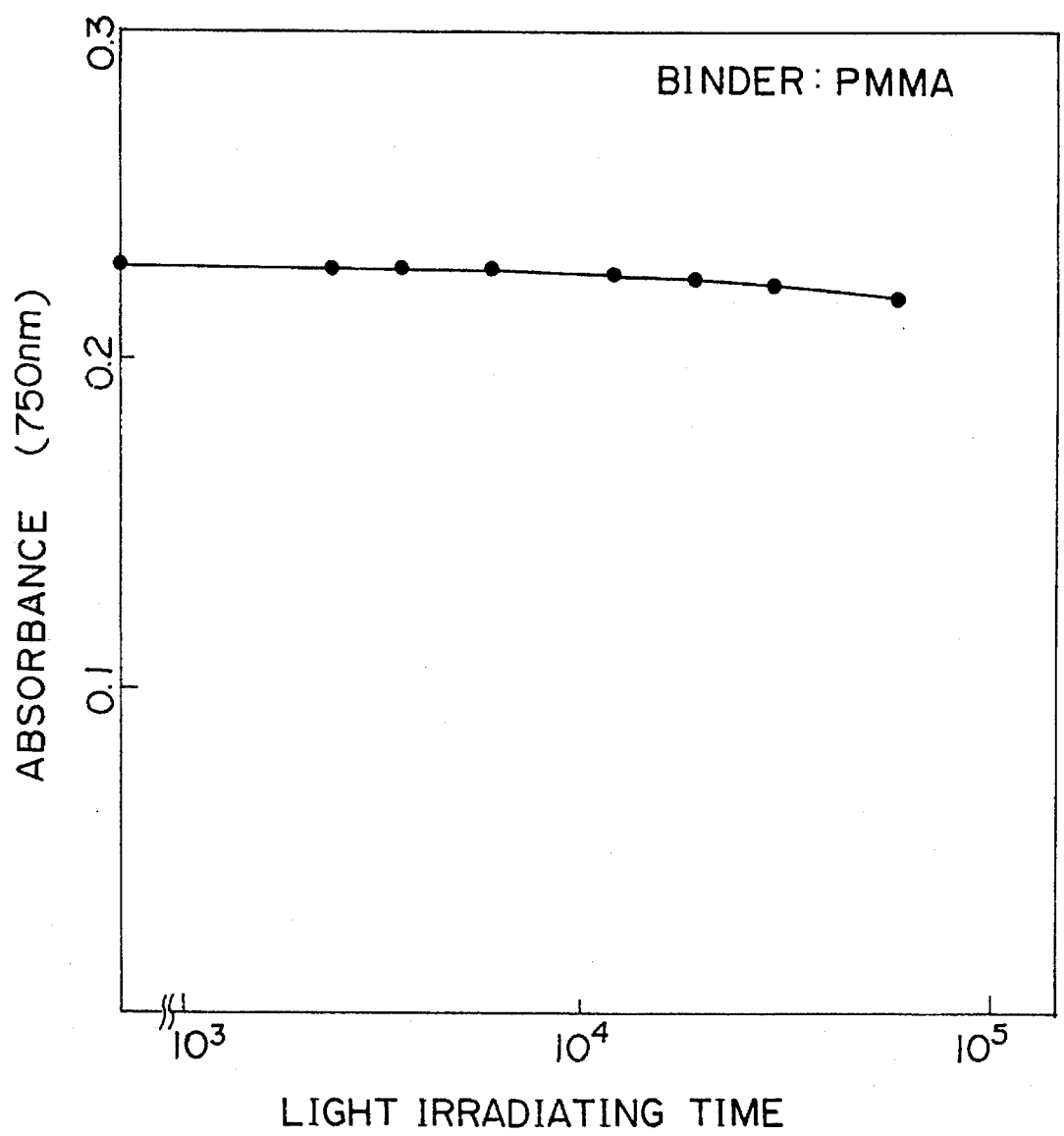
FIG. 5 is a graph showing a change of absorbance when the reproducing light having 750 nm of wavelength is continuously irradiated to Sample 2.

The results are shown in the graphs in FIGS. 2 to 4. The results shows that the quantum yield is zero and the absorbance is the plus value in the range of 750 nm or longer of wavelength in each of Samples 1 to 3 according to the present invention. Therefore, it can be understood that the light having 750 nm or longer of wavelength can be used as a reproducing light, and, even if the reproducing light having 750 nm or longer of wavelength is continuously irradiated to the record part, the absorbance is not changed. The absorbance was in practice determined by using Sample 2 and the result is shown in FIG. 5. Therefore, it can be confirmed that the information recorded in the optical recording medium according to the present invention is reliably retained even if reproduction is repeated.

COMPARATIVE EXAMPLE

The 0.1M solution of the compound of the formula I wherein R1 to R4 were methyl, respectively, in toluene was filled up with a quarts cell to prepare a comparison sample.

When the recording light having 400 nm of wavelength was irradiated to the comparison sample, the coloring reaction (Reaction A) occurred to form the colored record part. Then, various erasing lights such as those having 550 nm, 650 nm and 750 nm of wavelength were irradiated, but the discoloring reaction (Reaction B) did not occur so the colored state is retained. From this result, it is to be understood that the record film prepared by the comparison sample will not have the photochromic property.

What is claimed is:

1. An optical recording medium consisting essentially of:
   a base plate; and
   a record film, on which information is recorded, disposed on the base plate, said record film containing 5-dimethylamino indolyl fulgide and a resin binder.

2. An optical recording medium according to claim 1, wherein 5-dimethylamino indolyl fulgide is in a open ring form of a following formula I,

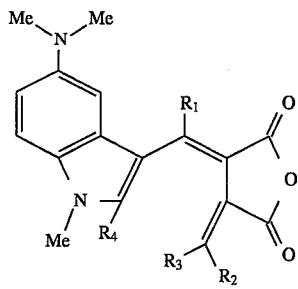

wherein R1 to R4 are, respectively, hydrogen, halogen, alkyl, alkoxyl, aryl, aryloxy, allyl, aralkyl, amino, pyrrolyl, furil, thienyl, thiazolyl, oxazolyl, cyano, nitro, ester or trifluoromethyl, and are the same or different kinds, and Me is methyl.

3. An optical recording medium according to claim 1, wherein 5-dimethylamino indolyl fulgide is in a closed ring form of a following formula II,

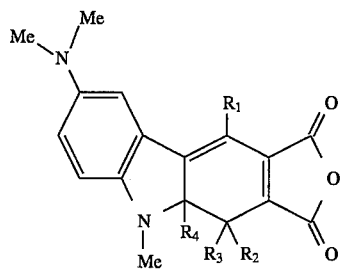

wherein R1 to R4 are, respectively, hydrogen, halogen, alkyl, alkoxyl, aryl, aryloxy, ally, aralkyl, amino, pyrrolyl, furil, thienyl, thiazolyl, oxazolyl, cyano, nitro, ester or trifluoromethyl, and are the same or different kinds, and Me is methyl.

4. An optical recording medium according to claim 1, wherein the resin binder is contained by 5 to 500 parts by weight, per part of 5-methylamino indolyl fulgide.

5. The optical recording medium according to claim 1, wherein the resin binder is selected from the group consisting of polymethyl methacrylate, polycarbonate, amorphous polyolefine, polystylene, polyvinyl chloride, polyvinyl acetate, polyvinyl butyrale, polyvinylidene chloride, polypropylene, polyethylene, polyacrylonitrile, urethane resin, epoxy resin, polyester, phenol resin, phenoxy resin, polyacrylate, polysulfone, polyether sulfone, polyallysulfone and polyether imide.

6. An optical recording medium according to claim 4 wherein the resin binder is contained by 20 to 100 parts by weight, per part of 5-methylamino indolyl fulgide.

* * * * *